(12) United States Patent
Chung-Chi Jim (10) Patent No.: US 7,085,408 B1
(45) Date of Patent: Aug. 1, 2006

(54) METHOD AND SYSTEM FOR TESTING IMAGE SENSOR SYSTEM-ON-CHIP

(75) Inventor: Li Chung-Chi Jim, San Jose, CA (US)

(73) Assignee: Magna Chip Semiconductor, Seoul (KR)

( * ) Notice: Subject to any disclaimer, the term of this patent is extended or adjusted under 35 U.S.C. 154(b) by 750 days.

(21) Appl. No.: 10/197,951

(22) Filed: Jul. 16, 2002

(51) Int. Cl.
*G06K 9/00* (2006.01)
(52) U.S. Cl. .................. 382/149; 382/312; 250/208.1; 356/237.1
(58) Field of Classification Search ............... 382/149, 382/218, 317, 312; 250/208.1, 332; 356/35.5, 356/237, 608, 491, 520, 394, 237.1; 73/579, 73/646; 324/770, 95; 348/250; 702/39, 702/56
See application file for complete search history.

(56) References Cited

U.S. PATENT DOCUMENTS

| | | | | |
|---|---|---|---|---|
| 4,764,805 | A * | 8/1988 | Rabbani et al. | 375/240.01 |
| 5,461,425 | A * | 10/1995 | Fowler et al. | 348/294 |
| 6,188,785 | B1 * | 2/2001 | Nakamura et al. | 382/149 |
| 6,456,899 | B1 * | 9/2002 | Gleason et al. | 700/212 |
| 6,541,751 | B1 * | 4/2003 | Bidermann | 250/208.1 |
| 6,661,515 | B1 * | 12/2003 | Worster et al. | 356/394 |
| 6,726,103 | B1 * | 4/2004 | Motta et al. | 235/454 |

\* cited by examiner

*Primary Examiner*—Matthew C. Bella
*Assistant Examiner*—Sheela Chawan
(74) *Attorney, Agent, or Firm*—Fernandez & Associates, LLP.

(57) ABSTRACT

Methods and systems for testing an image sensor system-on-chip (SOC). For testing an image sensor SOC that integrates a sensor array and an image processing component, defects are being searched separately in the sensor array and the image processing component in order to isolate possible defects of the sensor array from the possible defects of the image processing component. In so doing, the location of the defects can be pin-pointed.

24 Claims, 7 Drawing Sheets

METHOD AND SYSTEM FOR TESTING IMAGE SENSOR SYSTEM-ON-CHIP

FIELD OF THE INVENTION

The invention relates to an image sensor system-on-chip (SOC), particularly to testing an image sensor SOC that comprises a sensor array component and an image processing component.

BACKGROUND

For an image sensor SOC that integrates a sensor array with an image processing component, chip defects are typically difficult to uncover until a certain sensed image is displayed with obvious visual errors. Discovery of any chip defect detected only at display time is obviously highly undesirable. What is needed is to test for any defects before the image sensor SOC is utilized in any application.

However, using conventional testing techniques, testing the output of the above image sensor SOC poses several problems. First, when the test result indicates image errors, which component (the sensor array or the image processing component) caused the indicated image error is difficult to discern. Second, situations can arise where image errors caused by the sensor array defects are "masked" by the image processing component. That is, the image errors caused by the sensor array can go undetected until display time.

BRIEF DESCRIPTION OF THE FIGURES

The accompanying drawings which are incorporated in and form a part of this specification, illustrate embodiments of the invention and together with the description, serve to explain the principles of the invention.

DETAILED DESCRIPTION

Reference is made in detail to embodiments of the invention. While the invention is described in conjunction with the embodiments, the invention is not intended to be limited by these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, as is obvious to one ordinarily skilled in the art, the invention may be practiced without these specific details. In other instances, well-known methods, procedures, components, and circuits have not been described in detail so that aspects of the invention will not be obscured.

Figure 1:
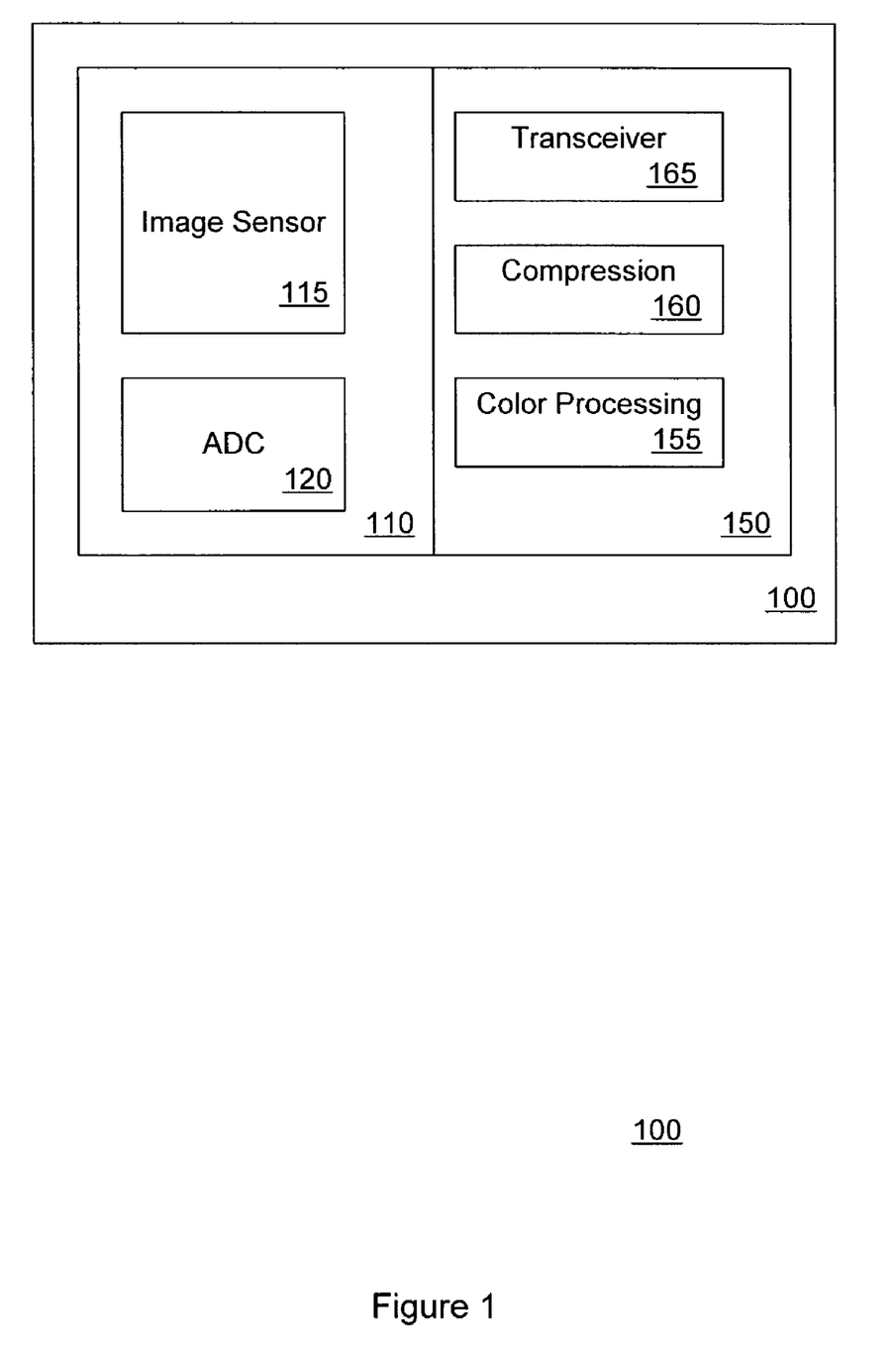
FIG. 1 shows an image sensor system-on-chip (SOC) that comprises an image sensor array and an image processing component in accordance with one embodiment of the invention.

Referring now to FIG. 1, an image sensing system-on-chip (SOC) 100 is shown in accordance with one embodiment of the invention. Image sensor SOC 100 is introduced to facilitate the description of various tests performed on an image sensor SOC in accordance with various embodiments of the invention.

In the present embodiment, image sensor SOC 100 comprises circuit components relating to image sensing, as well as circuit components relating to image processing. Broadly speaking, SOC 100 comprises an image sensor array 110 and an image processing component 150. Image sensor array 110 comprises circuit components relating to image sensing. Image processing component comprises circuit components relating to image processing.

Image sensor array 110 comprises an image sensor 115, and an analog-to-digital converter (ADC) 120. Image sensor array 110 is adapted for capturing and digitizing images to be processed by image processing component 150. Image sensor SOC 100 is typically used within an image capturing device that could be, but is not limited to, a digital camcorder, a digital still camera, a video phone, a video conferencing equipment, a PC camera, a cell phone, or a security monitor.

Image processing component 150 comprises a color processing component 155, a compression engine 160, and a transceiver 165. Color processing component 155 typically performs digital image processing that could include, but is not limited to, auto exposure control, auto white balancing and image sharpening. However, color processing component 150 need not include all of the image processing functions mentioned above.

Images are captured by sensor 115, then digitized by ADC 120 into pixel values to be transmitted to image processing component 150. The pixel values are compressed by color processing component 155. In turn, the color processed pixel values undergo further data compression performed by compression engine 160. The processed image data is then transmitted out of image sensor SOC 100 by transceiver 165.

As understood herein, image sensor 115 could be, but is not limited to, a CMOS sensor. Also, although conventional compression technique such as JPEG could be performed by compression engine 160, other compression techniques could also be adapted by compression engine. Furthermore, transceiver 165 could be, but is not limited to, a USB transceiver or a wireless transceiver.

Figure 2:
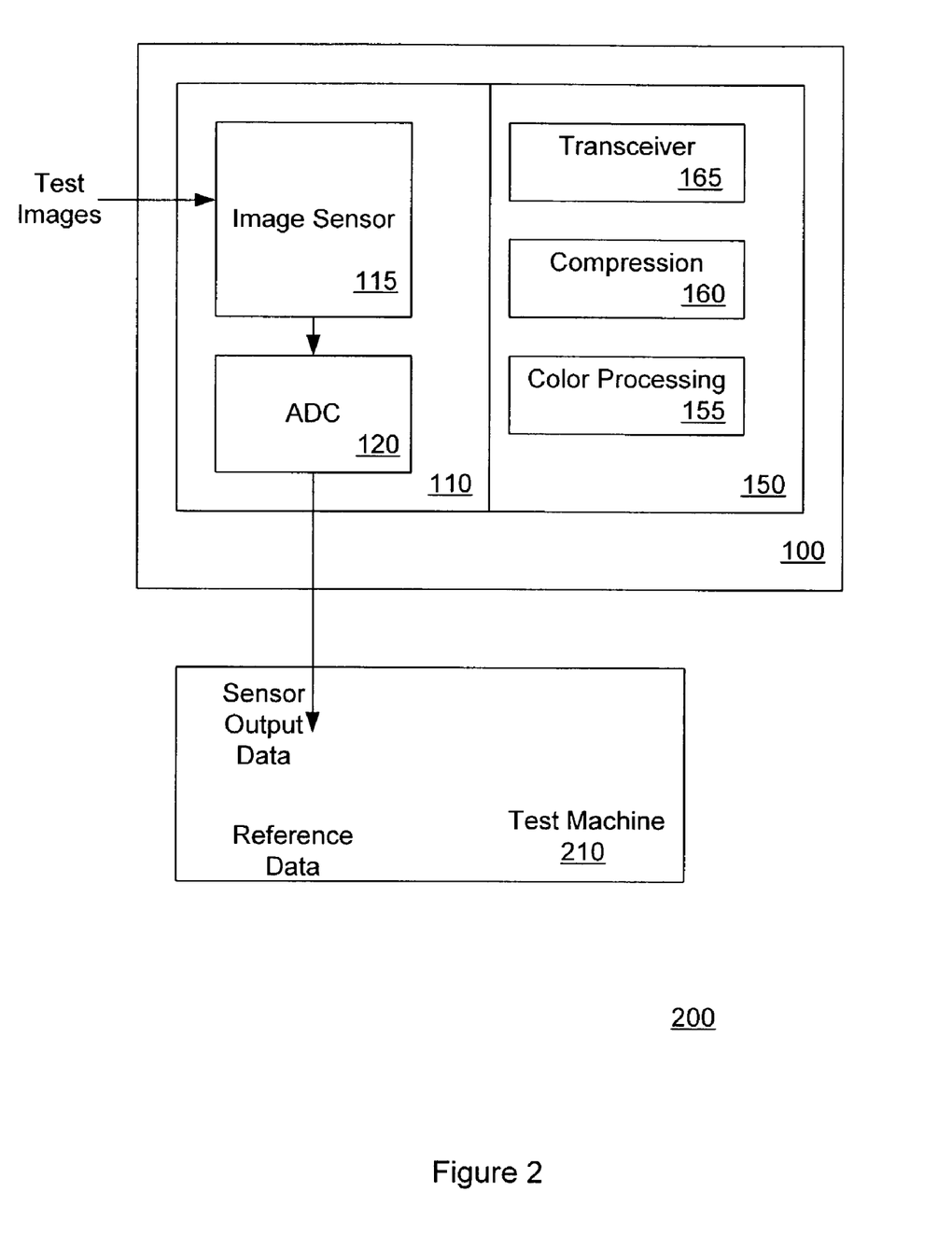
FIG. 2 shows a system for testing an image sensor SOC in accordance with one embodiment of the invention.

Referring now to FIG. 2 in view of FIG. 1, a test system 200 for testing image sensor SOC 100 is shown in accordance with one embodiment of the invention.

Test system 200 comprises image sensor SOC 100 and a test machine 210. Test machine 210 is typically a PC. However, as understood herein, test machine 210 generally could be any machine having processing power for performing the test intended for image sensor SOC 100. Test machine 210 has a transceiver for communicating data with image sensor SOC 100. Moreover, test machine 210 has a processing system coupled to the transceiver. The processing system can have one or more processors. In test system 200, test machine 210 is coupled to image sensor array 110 of image sensor chip 100. In turn, tests are performed to isolate defects in image sensor array 110 from defects that might be caused by image processing component 150.

Specifically, test images are fed to image sensor array 110 wherein the test images undergo image capture by image sensor 115 to generate captured images. In turn, the captured images are fed to ADC 120, wherein the captured images undergo image digitization by ADC 120 to produce sensor output data in the form of pixel values. The test images fed can be, but are not limited to, live images, or computer generated image patterns. The sensor output data from ADC 120 is fed to test machine 210. The sensor output data are intended to be compared with reference data provided by test machine 210.

On the other hand, test machine is adapted to simulate image sensor array 110 operating without defect. Specifically, by operating on test images, test machine 210 generates reference pixel values as reference data, wherein the generated reference data are equivalent to defect-free output of sensor array 110. Alternatively, without operating on test images, test machine 210 can provide reference data already stored in memory, wherein the pre-stored reference data are equivalent to defect-free output of sensor array 110. In both cases, the reference data are then compared by test machine 210 to sensor output data from image sensor array 110.

As the sensor output data are compared with reference data (i.e., the output of defect-free sensor array 110) by test machine 210, any discrepancy between the sensor output data and the reference data is detected by test machine 210. In turn, the detected discrepancies are used by test machine 210 to evaluate the likelihood of defect within image sensor array 110. If the discrepancy detected falls within acceptable range, then no defect within image sensor array 110 is indicated. If the discrepancy detected falls outside of acceptable range, then defect within image sensor array 110 is indicated.

Specifically, the output data of image sensor 115 is analog in nature. (That is, two sensor array outputs resulting from the same test image need not be identical.) As the analog output data are digitized by ADC 120, uncertainty can be introduced into the sensor output data of sensor array 110. As such, discrepancy can be expected between the sensor output data and the reference data. Thus, the presence or absence of discrepancy is not used to determine the presence of defect. Rather, the "size" of discrepancy is used to determine the presence of defect. That is, if the detected discrepancy is greater than allowable range, then test machine 210 indicates the presence of defect in image sensor array 110 and pin-points the location and type of defects pertaining to sensor array component 110 of SOC 100.

Figure 3:
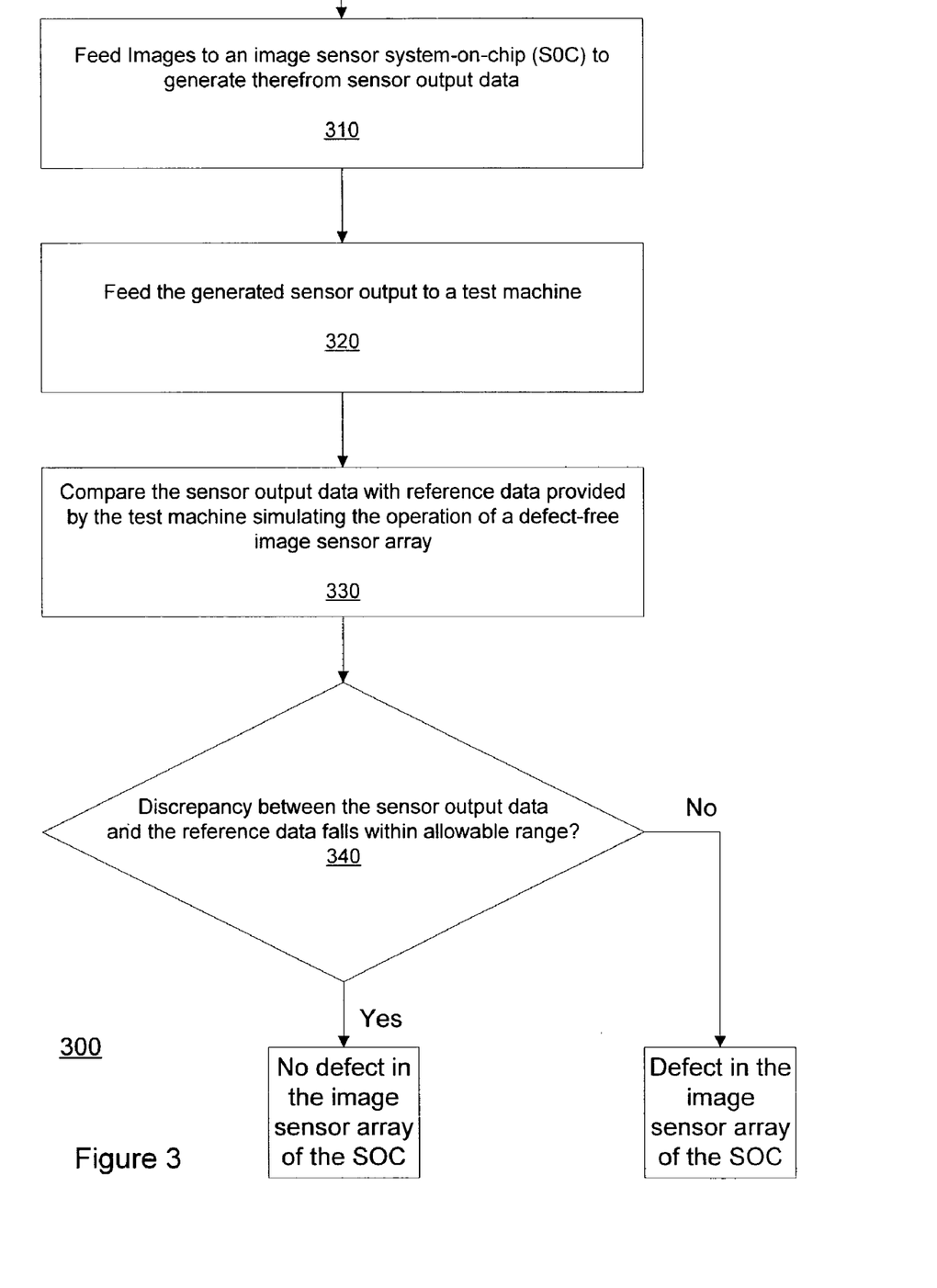
FIG. 3 is a flow chart that outlines steps for performing test on an image sensor SOC in accordance with the embodiment presented by FIG. 2.

Referring now to FIG. 3 in view of FIG. 2, a flow chart 300 is shown outlining steps for performing test to isolate defects in sensor array component 110 of image sensor SOC 100 in accordance with the embodiment presented by FIG. 2.

In step 310, test input images are fed to sensor array component 110 of image sensor SOC 100. The test images are captured by image sensor 115, then digitized by ADC 120 to produce actual sensor output data that are typically fed to image processing component 150 of SOC 100. Test images can be, but are not limited to, computer generated test image patterns or real live images.

In step 320, the sensor output data from ADC 120 is fed to test machine 210 rather than continuing on to image processing component 150 of SOC 100.

In step 330, the actual sensor output data are compared with reference data provided by test machine 210 for uncovering any defect that might be present in sensor array 110 of SOC 100. The reference data are equivalent to defect-free sensor output data of image sensor array 110, because test machine 210 simulates the operation of image sensor array 110 having no defect. Any detected defect is isolated from possible defects of image processing component 150 of SOC 100, because test machine 210 intercepts the actual sensor output data before they are fed to image processing component 150 of SOC 100. As such, test machine 210 bypasses image processing by image processing component 150 of SOC 100.

In query step 340, the result of comparison is evaluated. Specifically, discrepancy between the actual sensor output data and the reference data is expected because the analog circuit elements of image sensor 115 introduces uncertainty into the actual sensor output data. As such, test machine 210 indicates the presence of defect in sensor array 110 if the discrepancy found to be greater than allowable range. If any defect is found, then the location and type of defect is indicated by test machine 210. Otherwise, test machine 210 reports no defect in sensor array 110 of SOC 100.

Figure 4:
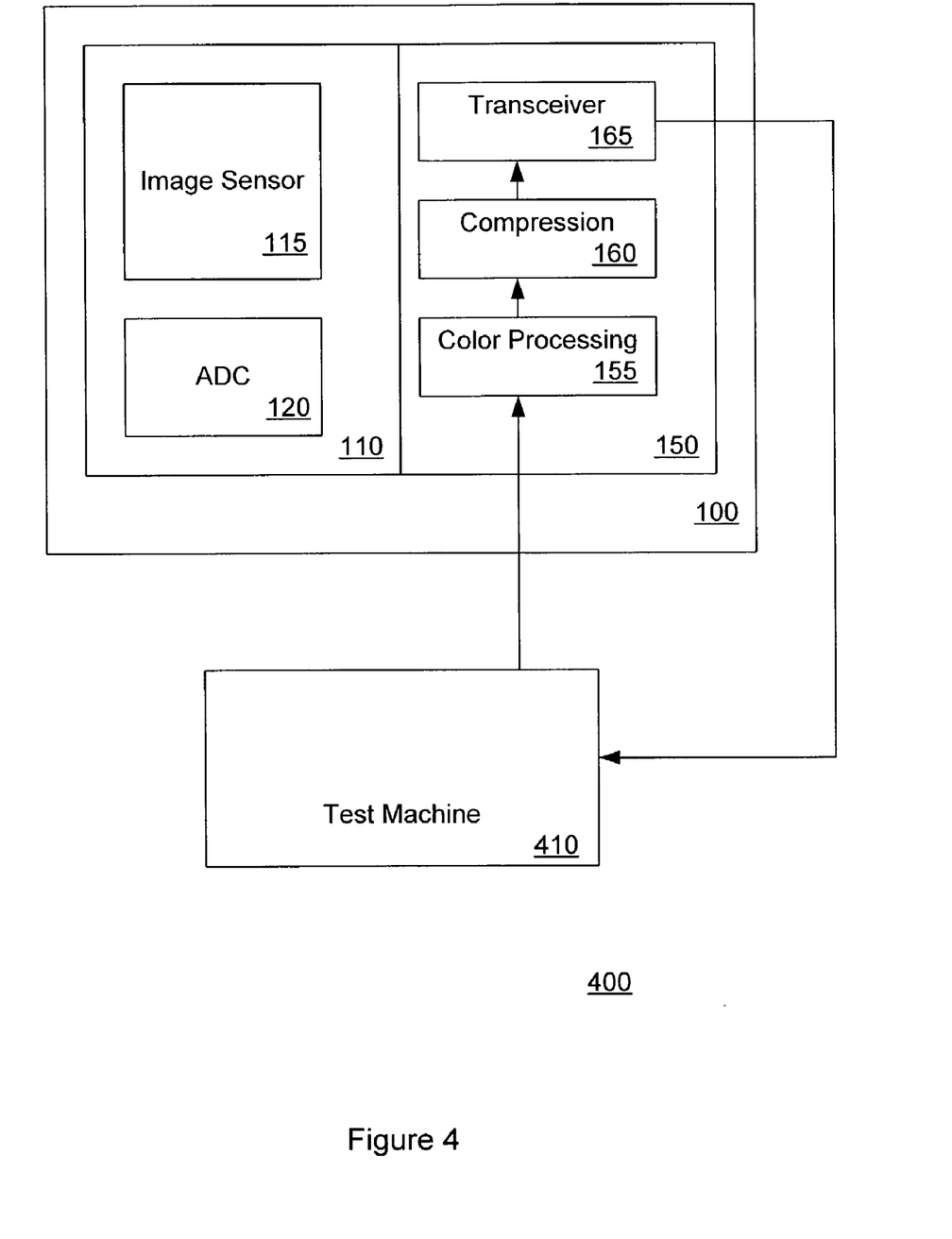
FIG. 4 shows another system for testing an image sensor SOC in accordance with one embodiment of the invention.

Referring now to FIG. 4 in view of FIG. 1, a test system 400 for testing image sensor SOC 100 is shown in accordance with one embodiment of the invention.

Test system 400 comprises image sensor SOC 100 and a test machine 410. Test machine 410 is typically a PC. However, as understood herein, test machine 410 generally could be any machine having processing power for performing the test intended for image sensor SOC 100. Test machine 410 has a transceiver for communicating data with image sensor SOC 100. Moreover, test machine 410 has a processing system coupled to the transceiver. The processing system can have one or more processors.

In test system 400, test machine 410 is coupled to image processing component 150 of image sensor SOC 100. Using test machine 410, tests are performed to detect and isolate defects in image processing component 150 from possible defects in image sensor array 110.

Test machine 410 is adapted to provide test data to be fed to image processing components. The test data can be simulated output data of ADC 120, or any data having the data type of output data from ADC 120. The test data are fed from test machine 410 to image processing component 150 without involving sensor array component 150 of SOC 100.

Additionally, test machine 410 is adapted to simulate defect-free operation of image processing component 150, thereby generating simulated image processed data that is equivalent to output image processed data of image processing component 150 operating without defect. The simulated image processed data would then be compared as reference data by test machine 410 to actual image processed data generated by image processing component 150 from the test data.

Any discrepancy between the output data and the simulated image processed data is detected by test machine 410. In turn, if any discrepancy is detected, then the detected discrepancy is used by test machine 410 to pin-point the location and type of defects pertaining to image processing component 150 of SOC 100.

Because test data do not come from sensor array component 110 in the present embodiment, any detected data difference would not be attributed to sensor array 110. Rather, any detected data difference would be caused by defects of image processing component 150 of SOC 100.

Figure 5:
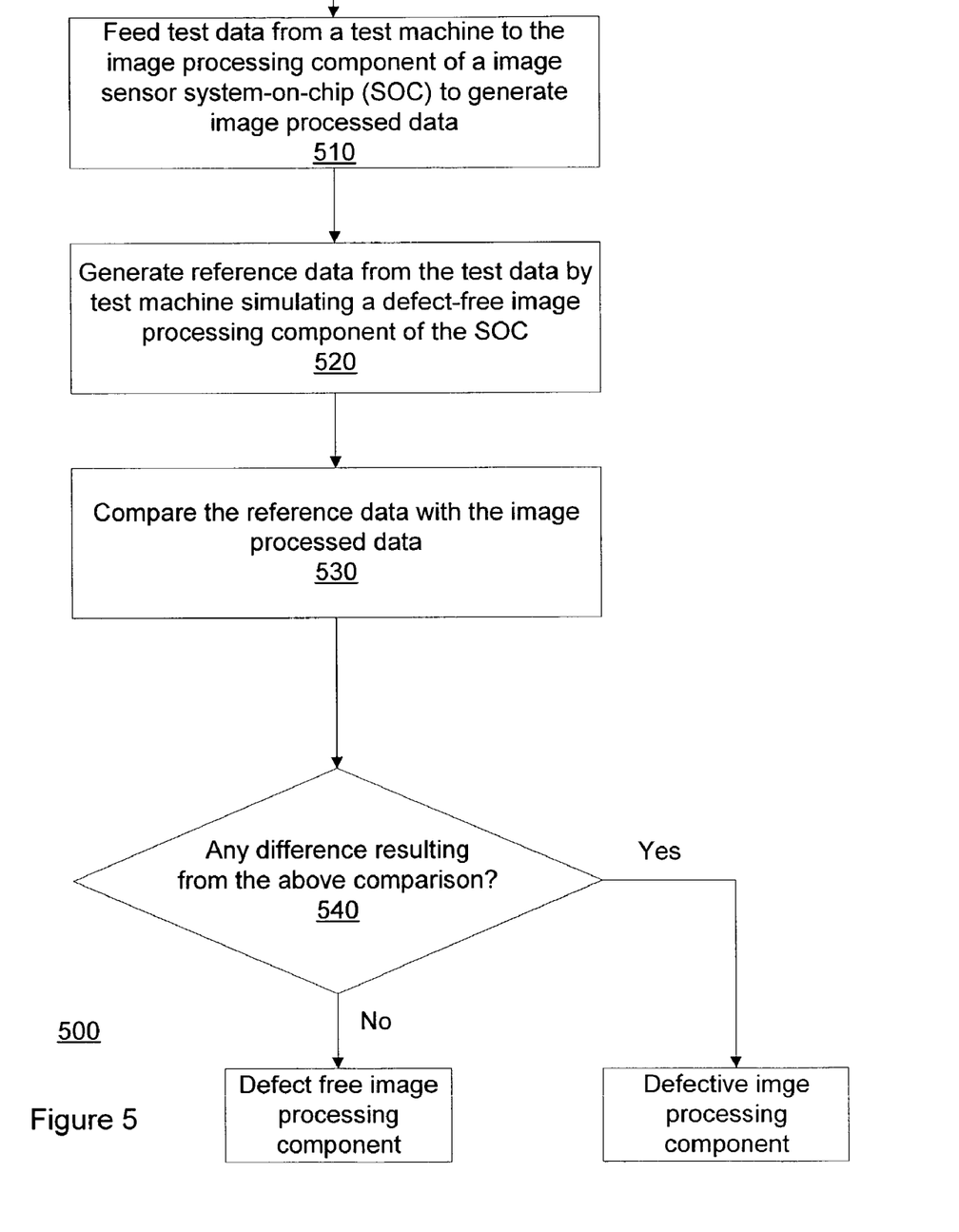
FIG. 5 is a flow chart that outlines steps for performing test on an image sensor SOC in accordance with the embodiment presented by FIG. 4.

Referring now to FIG. 5 in view of FIG. 4, a flow chart 500 is shown outlining steps for performing test on image sensor SOC 100 in accordance with the embodiment presented by FIG. 4.

In step 510, test data provided by test machine 410 are fed directly to image processing component 150 of SOC 100, thereby bypassing sensor array component 110 of SOC 100. Test data are transformed into image processed data as these test data undergo image processing by image processing component 110.

In step 520, reference data are generated from test data by test machine 140 simulating defect-free image processing component 150.

In step 530, the image processed data generated by image processing component 110 of SOC 100 are fed back to test machine 410 for comparison with the reference data. The comparison is performed for uncovering any defect that might be present in image processing component 150 of SOC 100. Since the reference data represents processed data from a defect-free image processing component 150, difference between the image processed data and the reference data would indicate defect of image processing component 150. Moreover, test machine 410 bypasses image sensing by sensor array component 110 of SOC 100. As such, any detected defect is isolated from possible defects of sensor array component 110 of SOC 100, because sensor array component 110 is not involved in the test.

In query 540, the result of comparing the output data with the reference data is determined. If any discrepancy is detected, then the location and type of detected defect are indicated by test machine 410. Otherwise, image processing component 150 of SOC 100 is deemed to be free of defects.

Figure 6:
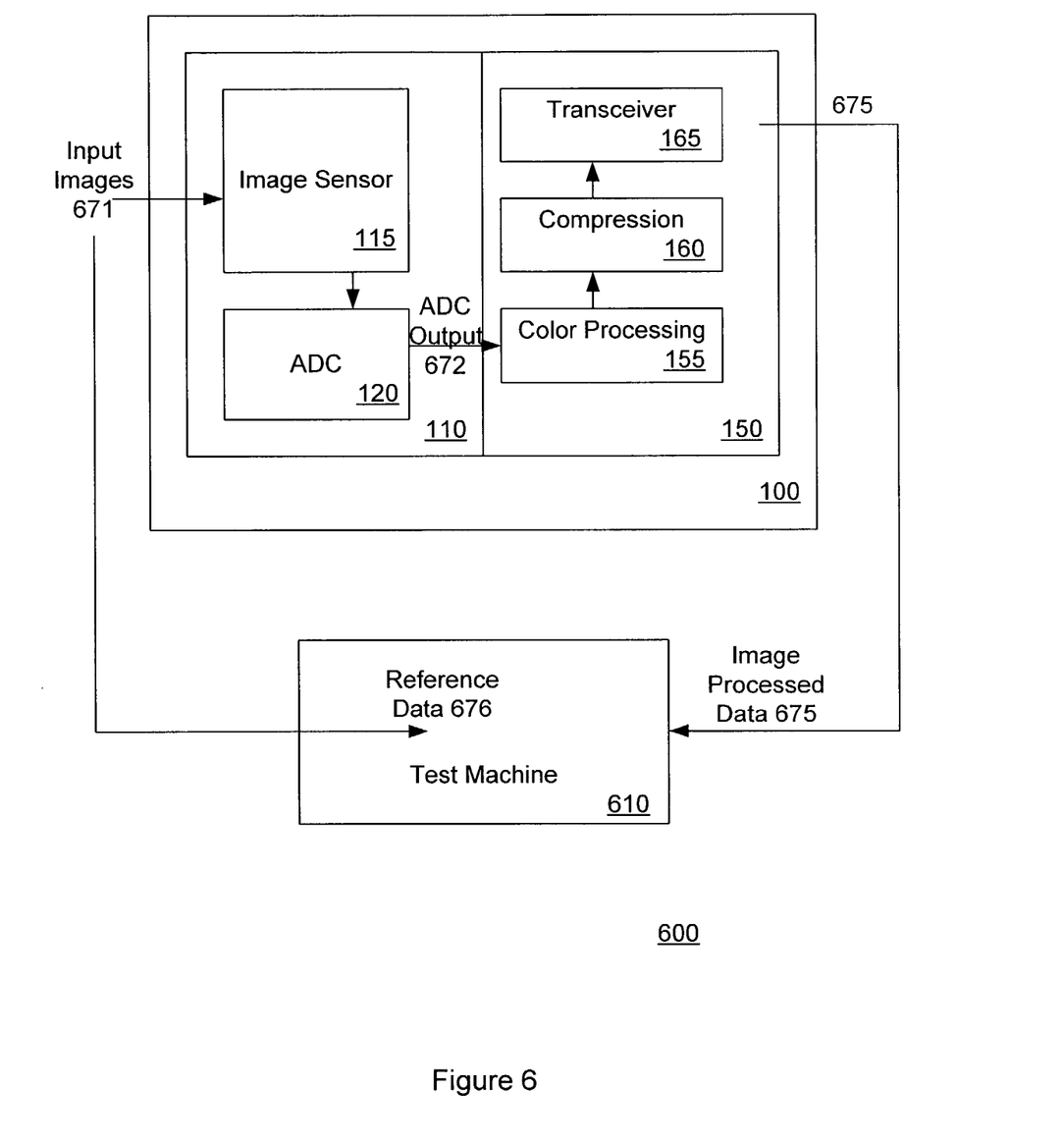
FIG. 6 shows yet another system for testing an image sensor SOC in accordance with one embodiment of the invention.

Referring now to FIG. 6 in view of FIG. 1, FIG. 6 shows yet another system 600 for testing image sensor SOC 100 in accordance with one embodiment of the invention. Test system 600 comprises image sensor SOC 100 and a test machine 610. Test machine 610 is typically a PC. However, as understood herein, test machine 610 generally could be any machine having processing power for performing the test. Test machine 610 has a transceiver for communicating data with image sensor SOC 100. Moreover, test machine 610 has a processing system coupled to the transceiver. The processing system can have one or more processors.

In test system 600, test machine 610 is coupled to image processing component 150 of image sensor SOC 100. Test machine 610 is adapted to test the "bridge" between image sensor array 110 and image processing component 150. That is, test machine 610 is adapted to search for defect in the coupling between image sensor array 110 and image processing component 150.

Specifically, on the one hand, input images 671 (e.g., a real-time live images or a test pattern images) are fed to image sensor array 110 to generate a sensor array output image data 672 (ADC output) in the form of pixel values. In turn, sensor array output data 672 are transmitted to image processing component 150 for further processing. As a result, image processed data 675 is generated as output by image processing component 150 from the sensor array output data 672 received. Furthermore, image processed data 675 are fed to test machine 610.

On the other hand, input images 671 are also fed to test machine 610 to undergo processing by test machine 610, wherein the processing simulates defect-free operations of SOC 100. In turn, reference data 676 is generated by test machine 610 from input images 671. Reference data 676 generated by test machine 610 can be considered as the simulated output of image sensor SOC 100 as if the coupling between sensor array 110 and image processing component 150 were to operate defect-free.

Still referring to FIG. 6 in view of FIG. 1, the real processed image data 675 is fed to test machine 610 for comparison with reference data 676. Any discrepancy uncovered from the comparison is used to evaluate the likelihood of defects in the coupling between sensor array 110 and image processing component 150. As understood herein, the comparison can also take place in another machine that is capable of comparing the actual image processed data 675 and reference data 676.

Because sensor array 110 is analog in nature, different processing runs of SOC 100 can be expected to generate two non-identical outputs from the same input. As such, discrepancy can be expected between processed image data 675 and reference data 676. Thus, for the coupling between sensor array 110 and image processing component 150, the presence or absence of discrepancy is not used to determine the presence of defect. Rather, the "size" of discrepancy is used to determine the presence of defect. That is, if the detected discrepancy is greater than allowable range, then test machine 610 indicates the presence of defect in the coupling between image sensor array 110 and image processing component 150.

Figure 7:
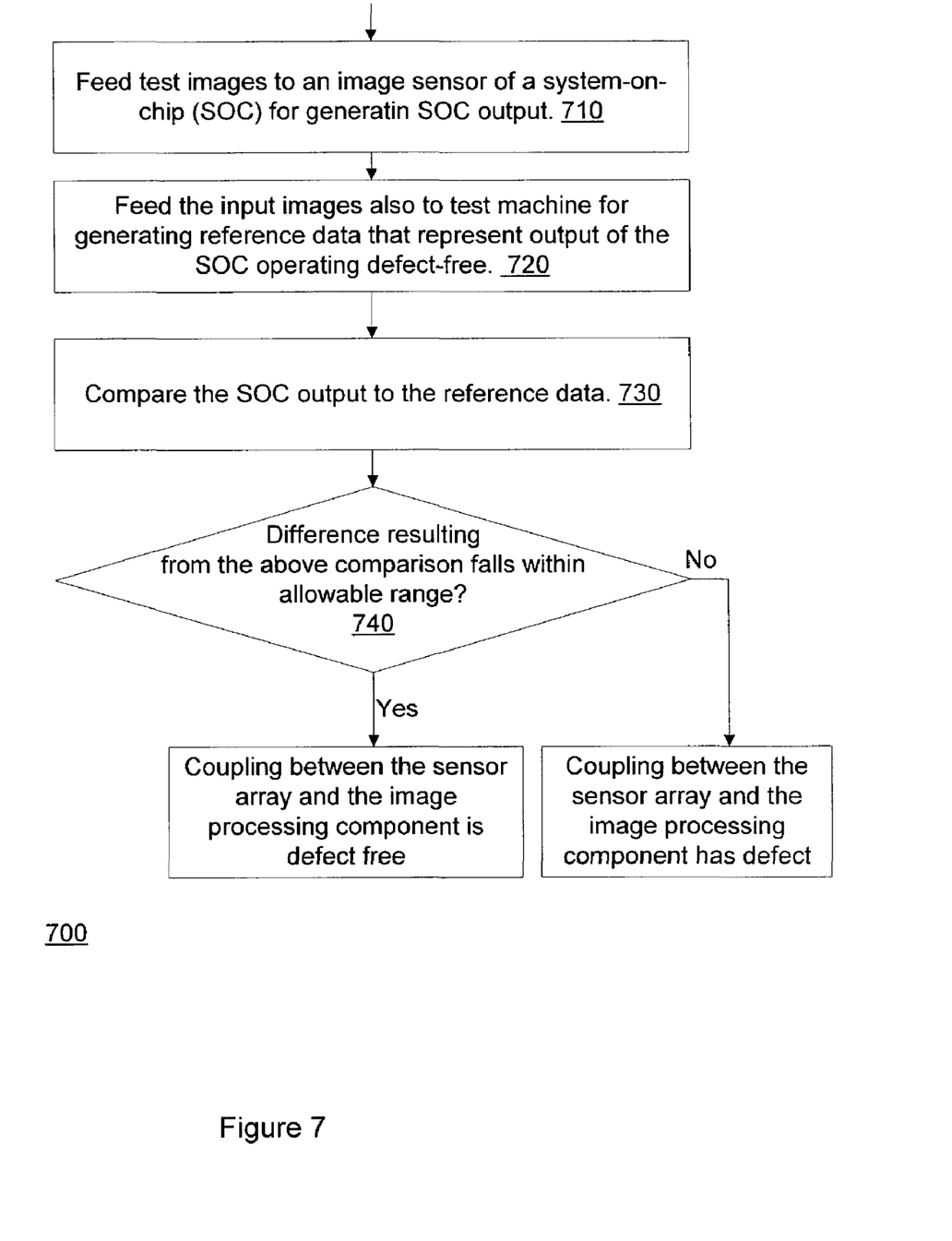
FIG. 7 is a flow chart that outlines steps for performing test on an image sensor SOC in accordance with the embodiment presented by FIG. 6.

Referring now to FIG. 7 in view of FIG. 6, a flow chart 700 is shown outlining steps for performing test on image sensor SOC 100 in accordance with the embodiment presented by FIG. 6.

In step 710, input images are fed to sensor array 110 of SOC 100. The input images are captured by image sensor 115, then digitized by ADC 120 into sensor array output data (i.e., ADC output data). After being received by image processing component 150, ADC output data are transformed by image processing component 150 into image processed data that are fed to test machine 610.

In step 720, the input images are fed to test machine 610 for processing to generate reference data. Specifically, the input images are processed by test machine 610 that simulates SOC 100 operating without defect. The reference data are generated by test machine 610 from the input images. The reference data simulate output of SOC 100 as if SOC 100 were to operate without defect.

In step 730, the image processed data generated from image process component 150 are compared by test machine 610 to the reference data.

In query step 740, a query is made to determine if any discrepancy uncovered by the comparison performed in step 740 falls within acceptable range. If no, then test machine 610 indicates the location and type of uncovered defect in the coupling between sensor array 110 and image processing component 150. Otherwise, no defect is reported by test machine 610.

Specifically, discrepancy between the actual output data of SOC 100 and the reference data is expected because the analog circuit elements of image sensor 115 introduces uncertainty into the actual output data of SOC 100. As such, test machine 610 indicates the presence of defect in the coupling between sensor array 110 and image processing component 150 if the discrepancy is found to be greater than allowable range. If any defect is found, then test machine 610 indicates defect in the coupling between sensor array 110 and image processing component 150. Otherwise, test machine 610 reports no defect in the coupling between sensor array 110 and image processing component 150.

As understood herein, test machines 210, 410 and 610 need not be separate machines. For example, in another embodiment of the invention, one single test machine can be used to conduct all of the above three test scenarios described respectively for test machines 210, 410 and 610.

In this embodiment of the invention, a single machine locates defect in an image sensor SOC such as SOC 100 shown in FIG. 1.

Specifically, without involving image processing component 150, the test machine isolates a search of defect to sensor array 110 by intercepting an output generated by sensor array 110 from test images. In turn, the output of sensor array 110 is compared to reference data that represents defect-free output of sensor array 110, wherein the reference data are provided by the test machine. If the comparison results in a difference greater than an allowable level, then the test machine indicates a defective sensor array 110.

Also, the machine isolates a search of defect to image processing component 150 by directly feeding test data to image processing component without involving sensor array 110. In turn, image processing component generates from the test data an output that is compared to reference data representing defect-free output of image processing component 150, wherein the reference data are generated by the test machine simulating image processing component operating without defect. If the comparison results in a difference, then the test machine indicates a defective image processing component 150.

Moreover, the test machine isolates a search of defect to the coupling between sensor array 110 and image processing component 150. Test images are fed both to SOC 100 and the test machine. From the test images, image processed data are generated by SOC 100 from test images. From the test images, reference data are generated by the test machine simulating SOC 100 operating without defect. In turn, the image processed data are compared to the reference data. If the comparison results in a difference greater than an allowable level, then the test machine indicates a defective coupling between sensor array 110 and image processing component 150.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching. The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents.

What is claimed is:

1. A method for locating defect in an image sensor system-on-chip (SOC) that integrates an image sensor array and an image processing circuit component, said method comprising the steps of:
    a) having a image sensor array test output formed on said image sensor system-on-chip(SOC) and coupled to a test system;
    b) identifying defect to said sensor array independent of said image processing circuit by feeding a plurality of test images to said sensor array to generate therefrom output data on said image sensor array test output;
    c) comparing said output data to a plurality of reference data representing defect-free output of said sensor array;
    d) characterizing analog nature of said image sensor array for establishing an allowable level of discrepancy; and
    e) in response to a difference uncovered from comparing said output data to said reference data, determining location and type of defect in said image sensor array using said uncovered data difference if said difference is greater than said allowable level of discrepancy.

2. The method of claim 1, wherein said sensor array comprises:
    a sensor; and
    an analog-to-digital converter (ADC) coupled to said sensor.

3. The method of claim 1, wherein said image processing circuit component comprises:
    a color processing circuit component adapted to color process said output image data from said image sensor array;
    a compression engine coupled to said color processing circuit component adapted to compressed said color processed image data; and
    a transceiver coupled to said color processing circuit component, said transceiver adapted to transfer said compressed image data out of said SOC.

4. A method for locating defect in an image sensor system-on-chip (SOC) that integrates an image sensor array and an image processing circuit component, said method comprising the steps of:
    a) having an image processing test input formed on said image sensor system-on-chip (SOC) and coupled to a test system;
    b) Simulating defect-free operation of said image processing component for preparing a plurality of simulated image processed data using said test system;
    c) identifying defect to said image processing component independent of said image sensor array by directly feeding a plurality of test data to said image processing test input to generate therefrom plurality of outputs that is compared with said ((a)) plurality of simulated image processed data representing defect-free output of said image processing circuit component;
    d) comparing said plurality of outputs with said plurality of simulated image processed reference data; and
    e) in response to said plurality of outputs being found different from said plurality of simulated image processed data, indicating location and type of defect of said image processing component.

5. The method of claim 4, wherein said sensor array comprises:
    a sensor; and
    an analog-to-digital converter (ADC) coupled to said sensor.

6. The method of claim 4, wherein said image processing circuit component comprises:
    a color processing circuit component adapted to color process said output image data from said image sensor array;
    a compression engine coupled to said color processing circuit component adapted to compressed said color processed image data; and
a transceiver coupled to said color processing circuit component, said transceiver adapted to transfer said compressed image data out of said SOC.

7. A method for locating defect in an image sensor system-on-chip (SOC) that integrates an image sensor array and image processing circuit component, said method comprising the steps of:
    a) having an image input on a test system and coupled to said image sensor system-on-chip (SOC);

b) Simulating defect-free operation of said image sensor system-on-chip (SOC) for preparing a plurality of reference data by feeding a plurality of test images to said image input on said test system;

c) characterizing analog nature of said image sensor array for establishing an allowable level of discrepancy;

d) identifying defect to the coupling between said image sensor array and said image processing circuit component by feeding said ((a)) plurality of test images to said sensor array for generating from said image processing component an output of image processed data;

e) comparing said image processed data with ((a)) said plurality of reference data representing defect-free output of said SOC; and f) in response to a difference found between said output of image processed data and said plurality of reference data, indicating location and type of defect of said coupling between said sensor and said image processing component if said difference is greater than said allowable level of discrepancy.

8. The method of claim 7, wherein said sensor array comprises:
   a sensor; and
   an analog-to-digital converter (ADC) coupled to said sensor.

9. The method of claim 7, wherein said image processing circuit component comprises:
   a color processing circuit component adapted to color process said output image data from said image sensor array;
   a compression engine coupled to said color processing circuit component adapted to compressed said color processed image data; and
   a transceiver coupled to said color processing circuit component, said transceiver adapted to transfer said compressed image data out of said SOC.

10. A machine for detecting defect in an image sensor system-on-chip (SOC) that integrates an image sensor array and image processing circuit components, said machine comprises:
    a transceiver adapted to couple to said image sensor array for intercepting output data resulting from said image sensor array operating on test images; and
    a processing system coupled to said transceiver, said processing system adapted to generate reference data by simulating said image sensor array operating defect-free on said test images, said processing system adapted to characterize analog nature of said image sensor array for establishing an allowable level of discrepancy by different processing runs of said image sensor system-on-chip (SOC), wherein the difference between said output data and said reference data is adapted to indicate defect of said image sensor array if said difference is greater than said allowable level of discrepancy.

11. The machine of claim 10, wherein said test images are a computer generated test image pattern.

12. The machine of claim 10, wherein said test images are live images.

13. The machine of claim 10, wherein said sensor array comprises:
    a sensor; and
    an analog-to-digital converter (ADC) coupled to said sensor.

14. The machine of claim 10, wherein said image processing circuit component comprises:
    a color processing circuit component adapted to color process said output image data from said image sensor array;
    a compression engine coupled to said color processing circuit component adapted to compressed said color processed image data; and
    a transceiver coupled to said color processing circuit component, said transceiver adapted to transfer said compressed image data out of said SOC.

15. A machine for detecting defect in an image sensor system-on-chip (SOC) that integrates an image sensor array and image processing circuit components, said machine comprises:
    a transceiver adapted to couple to said image processing component for bypassing said image sensor array and sending test data to said image processing component to be transformed into image processed data adapted to be fed back to said machine;
    a processing system coupled to said transceiver, said processing system adapted to generate reference data by simulating said image processing component operating defect-free on said test data, wherein the difference between said image processed data and said reference data is adapted to indicate defect of said image processing component.

16. The machine of claim 15, wherein said test images are a computer generated test image pattern.

17. The machine of claim 15, wherein said test images are live images.

18. The machine of claim 15, wherein said sensor array comprises:
    a sensor; and
    an analog-to-digital converter (ADC) coupled to said sensor.

19. The machine of claim 15, wherein said image processing circuit component comprises:
    a color processing circuit component adapted to color process said output image data from said image sensor array;
    a compression engine coupled to said color processing circuit component adapted to compressed said color processed image data; and
a transceiver coupled to said color processing circuit component, said transceiver adapted to transfer said compressed image data out of said SOC.

20. A machine for detecting defect in an image sensor system-on-chip (SOC) that integrates an image sensor array and image processing circuit components, said machine comprises:
    a transceiver adapted to couple to said image sensor array for receiving test images that are also fed to said image sensor array, said transceiver adapted to couple to said image processing circuit component for receiving image processed data from said image processing circuit component; and
    a processing system coupled to said transceiver for receiving said test images, said processing system adapted to generate reference data by simulating said SOC operating defect-free on said test images, said processing system adapted to characterize analog nature of said image sensor array for establishing an allowable level of discrepancy by different processing runs of said image sensor system-on-chip (SOC), wherein the difference between said image processed data and said reference data is adapted to indicate defect of the coupling between said sensor array and said image processing circuit component if said difference is greater than an allowable level.

21. The machine of claim 20, wherein said test images are a computer generated test image pattern.

22. The machine of claim 20, wherein said test images are live images.

23. The machine of claim 20, wherein said sensor array comprises:
   a sensor; and
   an analog-to-digital converter (ADC) coupled to said sensor.

24. The machine of claim 20, wherein said image processing circuit component comprises:
   a color processing circuit component adapted to color process said output image data from said image sensor array;
   a compression engine coupled to said color processing circuit component adapted to compressed said color processed image data; and
   a transceiver coupled to said color processing circuit component, said transceiver adapted to transfer said compressed image data out of said SOC.

* * * * *

UNITED STATES PATENT AND TRADEMARK OFFICE
CERTIFICATE OF CORRECTION

PATENT NO. : 7,085,408 B1  Page 1 of 1
APPLICATION NO. : 10/197951
DATED : August 1, 2006
INVENTOR(S) : Chung-Chi Jim Li

It is certified that error appears in the above-identified patent and that said Letters Patent is hereby corrected as shown below:

Title Page
Item (75), Inventor
Change "Li Chung-Chi Jim" to read -- Chung-Chi Jim Li --

Column 8, line 41
Delete "reference"

Signed and Sealed this

Second Day of January, 2007

JON W. DUDAS
*Director of the United States Patent and Trademark Office*